(12) United States Patent
Chang et al.

(10) Patent No.: US 7,558,638 B2
(45) Date of Patent: Jul. 7, 2009

(54) APPLYING REAL-TIME CONTROL TO A PRODUCTION SYSTEM

(75) Inventors: Qing Chang, Troy, MI (US); Pulak Bandyopadhyay, Rochester Hills, MI (US); Guoxian Xiao, Troy, MI (US); Stephan R. Biller, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/360,014

(22) Filed: Feb. 22, 2006

(65) Prior Publication Data
US 2007/0198135 A1   Aug. 23, 2007

(51) Int. Cl.
*G06F 19/00* (2006.01)
(52) U.S. Cl. .............................. 700/97; 700/99; 700/100
(58) Field of Classification Search ................. 700/97, 700/99, 108–109, 100
See application file for complete search history.

(56) References Cited

U.S. PATENT DOCUMENTS

| | | | | |
|---|---|---|---|---|
| 3,703,725 A | * | 11/1972 | Gomersall et al. | 700/97 |
| 5,369,570 A | * | 11/1994 | Parad | 705/8 |
| 5,446,671 A | * | 8/1995 | Weaver et al. | 700/100 |
| 6,263,253 B1 | * | 7/2001 | Yang et al. | 700/99 |
| 6,564,113 B1 | * | 5/2003 | Barto et al. | 700/99 |
| 6,970,805 B1 | * | 11/2005 | Bierma et al. | 702/182 |
| 7,054,702 B1 | * | 5/2006 | Barto et al. | 700/100 |
| 2003/0036939 A1 | * | 2/2003 | Flores et al. | 705/8 |
| 2003/0167238 A1 | * | 9/2003 | Zeif | 705/400 |
| 2003/0236585 A1 | * | 12/2003 | Kao et al. | 700/108 |
| 2005/0065830 A1 | * | 3/2005 | Duke et al. | 705/7 |
| 2005/0154625 A1 | * | 7/2005 | Chua et al. | 705/7 |
| 2006/0037018 A1 | * | 2/2006 | Fang et al. | 718/100 |
| 2006/0206222 A1 | * | 9/2006 | Dyer | 700/95 |
| 2007/0005170 A1 | * | 1/2007 | Schedel | 700/101 |
| 2007/0091355 A1 | * | 4/2007 | Rai | 358/1.15 |

OTHER PUBLICATIONS

Printout from www.archive.org showing links to Pro Model software dating back to at least Nov. 10, 2004.*
Printout from www.archive.org showing links to Simul8 Professional software dating back to at least Feb. 4, 2005.*

* cited by examiner

*Primary Examiner*—Ronald D Hartman, Jr.

(57) ABSTRACT

Methods, systems, and computer program products for controlling production systems. Methods include monitoring actual performance of a production system that includes a plurality of machines. The actual performance of the production system is compared to a planned level of performance of the production system. One or more short-term production constraints in the production system are identified in response to the actual performance being more than a threshold value away from the planned level of performance. A corrective action for the production system is determined to mitigate one or more of the short-term production constraints. The corrective action is applied to the production system.

19 Claims, 5 Drawing Sheets

APPLYING REAL-TIME CONTROL TO A PRODUCTION SYSTEM

BACKGROUND

Exemplary embodiments relate generally to production systems, and more particularly, to methods, systems and computer program products for optimizing production system throughput.

Throughput analysis for a production system can be very complex. The complexity of the analysis may be due to a complex process line layout, and/or to randomness in the process (including station breakdowns, random processing time, and the random number of parts produced by the system). Production throughput analysis is important for design, operation and management of production systems.

One key characteristic of any process performance is variability, due to the fact that a process rarely performs consistently over time. The bottleneck of a production line is the machine, or station, that most severely impedes the system performance. Bottlenecks are one of the main causes of system variability and fluctuation in production. Methods such as statistical bottleneck analysis (utilized to determine a long-term system bottleneck) cannot correctly identify short-term system bottlenecks. The reason is twofold: first, for short time periods, random events may not follow any distribution pattern; and second, initial conditions (e.g., initial buffer levels) are not important for long-term statistical bottleneck analysis while they are key parameters in short-term bottleneck analysis.

Short-term production analysis and short-term bottleneck identification are important to allowing manufacturing operations to respond optimally to dynamic changes in system behavior. Plant production monitoring systems can provide real time production information. Production supervisors use output from the system to make real time decisions, such as deciding initial and end buffer status and dispatch maintenance skill trades. However, the decisions are up to each individual's experience, and some times the decisions may be far from optimal. Currently, there is no systematic method, backed up by real-time decision support tools to help production supervisors effectively control and optimize plant operations on a day-to-day basis. A real-time supervisory control and on-line optimization method is needed to mitigate short-term production system constraints (e.g., bottlenecks) to improve system throughput.

SUMMARY

Exemplary embodiments relate to methods, systems, and computer program products for controlling production systems. Methods include monitoring actual performance of a production system that includes a plurality of machines. The actual performance of the production system is compared to a planned level of performance of the production system. One or more short-term production constraints in the production system are identified in response to the actual performance being more than a threshold value away from the planned level of performance. A corrective action for the production system is determined to mitigate one or more of the short-term production constraints. The corrective action is applied to the production system.

Systems for controlling production systems include an output device in communication with a production system that includes a plurality of machines and a processor in communication with the output device. The processor includes computer instructions for facilitating monitoring actual performance of the production system. The actual performance of the production system is compared to a planned level of performance of the production system. One or more short-term production constraints in the production system are identified in response to the actual performance being more than a threshold value away from the planned level of performance. A corrective action for the production system is determined to mitigate one or more of the short-term production constraints. The corrective action is applied to the production system via the output device.

Computer program products for controlling production systems include a storage medium readable by a processing circuit and storing instructions for execution by the processing circuit for facilitating a method. The method includes monitoring actual performance of a production system that includes a plurality of machines. The actual performance of the production system is compared to a planned level of performance of the production system. One or more short-term production constraints in the production system are identified in response to the actual performance being more than a threshold value away from the planned level of performance. A corrective action for the production system is determined to mitigate one or more of the short-term production constraints. The corrective action is applied to the production system.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments include an on-line supervisory control and optimization method to search for short-term production constraints and to mitigate those constraints to improve system throughput. The optimization uses playback simulation of the real production data to identify the bottleneck station which has the highest impact on system throughput. In addition, the playback simulation suggests control parameters of that station to reach a near balanced production line operation. The control parameters of that station are then set to the suggested control parameters. The optimized results ensure the smooth flow of products on the production line and may increase the performance of the line.

Figure 1:
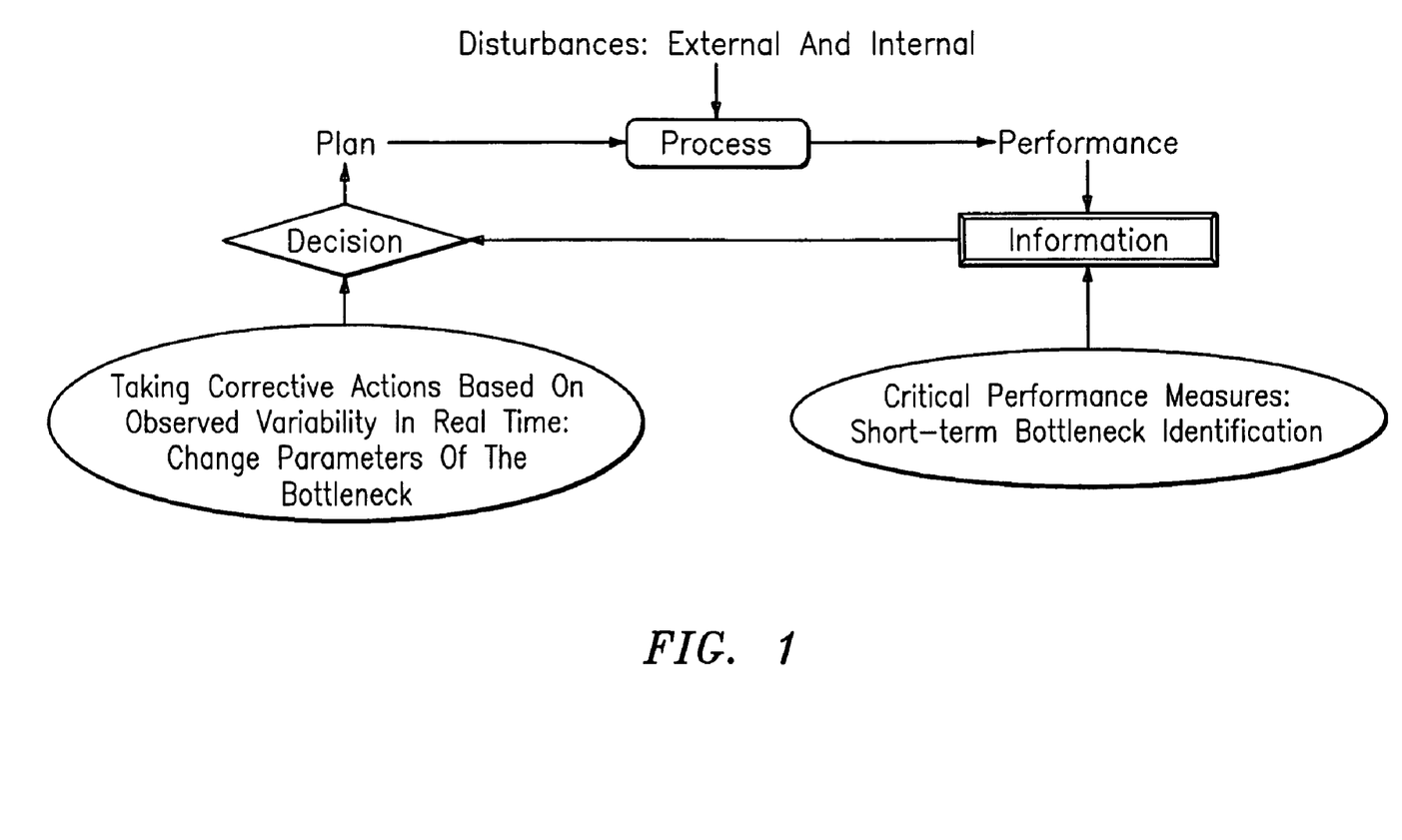
FIG. 1 is a block diagram of a process feedback control system utilized by exemplary embodiments.

Actual production performance will often deviate from planned performance due to various disturbances (e.g., machine random failures). Therefore, exemplary embodiments provide a feedback process control framework to manage process performance over time. In general, the feedback control of a dynamic production system involves two steps: collecting information about critical performance measures over time; and taking corrective actions based on observed variability in real time. In exemplary embodiments, this includes periodically monitoring actual performance, comparing it to planned levels of performance, investigating causes of observed variability between the two, and taking corrective actions to eliminate those causes. FIG. 1 depicts a block diagram of a process feedback control system, utilized by exemplary embodiments. FIG. 1 includes a production process that is subject to external and internal disturbances. The production process is executed and outputs real-time information that is utilized to identify short-term bottlenecks. Based on this information, a decision is made about what corrective action(s) to take (if any) based on an observed variability in real-time between an actual performance and a planned performance. If the observed variability is over a specified threshold amount, then a corrective action may be applied to the production system. The corrective action may include changing the control parameters on the machine/station with the bottleneck. The updated control parameters are input to the process. In this manner, the production system throughput is being monitored and throughput improved (if needed).

Variability in a production system is closely associated with (but not identical to) the randomness of the production process. Randomness in the production process may be due to factors such as machine random failures, operator availability, and quality problems. Some of the randomness (e.g., machine random failures) will cause bottleneck problems. Exemplary embodiments focus on identifying short-term throughput bottleneck problems and mitigating these problems in real time. A feedback control framework as illustrated in FIG. 2 is implemented by exemplary embodiments to improve the short-term bottlenecks based on process control concepts.

It is a common phenomenon that in a production line, some bottleneck stations in the process limit the amount of product, and this affects the overall production of the production line. Long-term throughput bottleneck analysis may be useful for identifying line balance problems for long-term, steady state situations and therefore long-term throughput bottleneck analysis provides guidelines for long-term solutions and system design. For day-to-day production operation, plant managers are more interested in identifying short-term throughput bottlenecks in order to be able to make quick fixes to alleviate any problems so that the production target or demand can be met.

Figure 2:
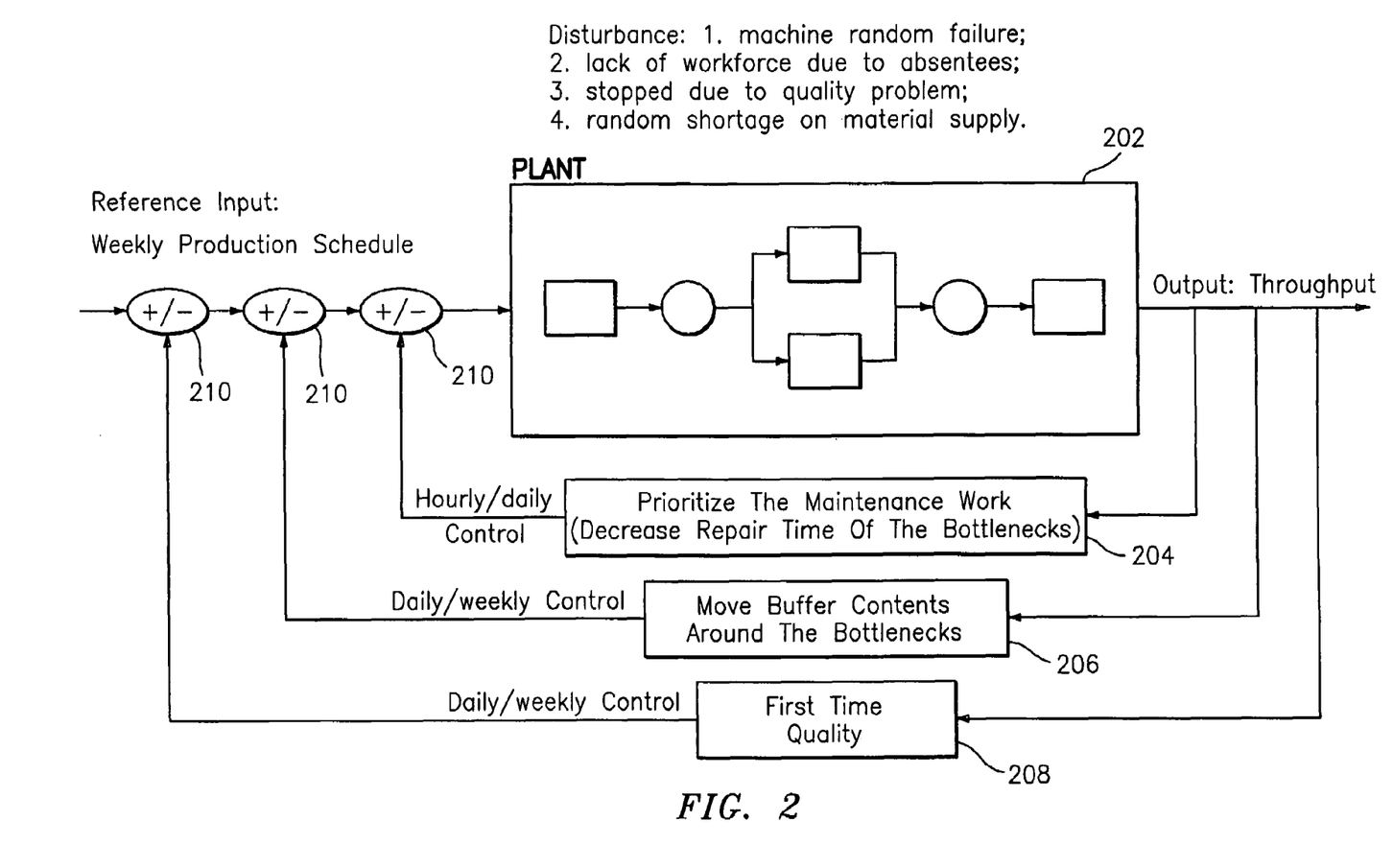
FIG. 2 is a real-time feedback control framework utilized by exemplary embodiments to enable systematic production process control.

Exemplary embodiments provide a short-term bottleneck identification method to be utilized in a feedback control loop such as the one depicted in FIG. 2. FIG. 2 depicts an exemplary real-time feedback control framework that may be utilized to enable systematic production process control. The supervisory control process depicted in FIG. 2 identifies short-term production constraints, such as bottlenecks, and takes actions to mitigate the bottlenecks such that the system performance (e.g., throughput) will be improved to reach the planned/expected objectives (i.e., to be within a threshold level of the planned objectives). The bottlenecks may include, but are not limited to, throughput bottlenecks, quality based bottlenecks, and work in process bottlenecks.

The control loop depicted in FIG. 2 includes a production system 202 with several stations. The production system 202 may be subject to several disturbances such as machine random failure, lack of workforce due to absentees, stopped due to a quality problem, and random shortage on material supply. Output from the production system 202 includes throughput (i.e., products). Based on the results, or output, from the production system 202 actions may be taken to mitigate any bottlenecks. As depicted in FIG. 2, some of the actions may include: prioritize the maintenance work (decrease repair time of the bottlenecks) 204; move buffer contents around the bottlenecks (206); and first time quality (FTQ) alert 208. This list of bottleneck mitigation actions is intended to exemplary and other actions are possible (e.g., change production cycle speed).

FTQ refers to what fraction of the products that enter the production line exit without having had to repeat any stations (i.e., did not have to undergo rework). FTQ is a line-level quality measure in that it does not consider the quality events that may have happened to products within the system, only that a given product did not experience any rework. This measure, while providing a higher level view of production quality, does not identify internal quality problems that may be significant.

Also as depicted in FIG. 2, these mitigating actions may be performed on an hourly, daily and/or weekly basis and the updated control parameters associated with the mitigation actions are fed into their respective controller 210 for adjustments to control parameters on stations within the production system 202.

Figure 3:
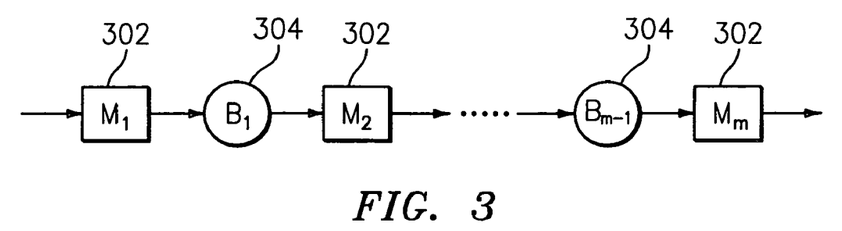
FIG. 3 is a model of an exemplary serial production line.

The model of a serial production line depicted in FIG. 3 is utilized herein as an example production system 202 for discussion purposes. Other production system 202 configurations may be supported by exemplary embodiments. The blocks represent the stations, or machines 302 and the circles are the buffers 304. As depicted in FIG. 3, the production system 202 includes "m" machines 302 arranged serially and "m−1" buffers 304 separating each consecutive pair of machines 302. In exemplary embodiments, each machine ($M_i$) 302 has two states: up and down. When in the up state, the machine 302 operates at its cycle time and when the machine 302 is in the down state, no production takes place. In general, machine cycle time cannot be freely changed. For the purposes of the discussion herein, the uptime and downtime of each machine ($M_i$) 302 are random variables and each buffer ($B_i$) 304 is characterized by its capacity. Also, in exemplary embodiments, it is assumed that the mean time between failure (MTBF) of each machine ($M_i$) 302 is much longer than its mean time to repair (MTTR).

Overall system throughput, $TP_{sys}$, over a time period is a function of the throughput, $TP_i$, of each machine 302 and may be expressed as:

$$TP_{sys}(t) = f(TP_1(t), \ldots, TP_m(t)). \quad (1)$$

The throughput of each individual machine 302 is a complex function of its cycle time, MTTR, MTBF and adjacent buffers 304 and may be represented as:

$$TP_i(t) = \phi(MTTR_i(t), MTBF_i(t), \text{Buffer}_{i-1}(t), \text{Buffer}_i(t), \text{CycleTime}_i(t)). \quad (2)$$

Here, $TP_{sys}$ is the production line performance measure, and $TP_i$ is the throughput for individual station i. The sensitivity of $TP_{sys}$ with respect to $TP_i$ is important, and is $$\frac{\Delta TP_{sys}}{\Delta TP_i}. \tag{3}$$

From a control standpoint, if the system is currently operating under a certain value of $TP_i$ and the sensitivity is small, then it is immediately known that a change to $TP_i$ will have little effect on the overall system performance. This, in turn, implies that when the system satisfies the current $TP_i$, then it is not worthwhile to tune the parameters of $TP_i$. In this case, either a larger change of $TP_i$ in the hope of improving system performance should be attempted, or $TP_i$ should be left alone because the overall system performance cannot be improved by adjusting $TP_i$. If the sensitivity value with respect to every station is very small, then the system cannot be improved and reaches a nearly balanced situation. When the system is in a nearly balanced situation, the actual system performance is within a threshold amount of the planned level of system performance.

Based on the above, the ideal performance of the system or the optimal situation for the system can be described as:

$$\frac{\Delta TP_{sys}}{\Delta TP_i} = 0 \tag{4}$$

$$\forall i \in (1, \ldots, N).$$

This sensitivity estimation means that the system performance cannot be improved by adjusting any individual machine's 302 throughput. The production line is then considered to be a balanced line which is more efficient than an unbalanced line.

Sensitivity estimation provides a good local measure of the effect of $TP_i$ on performance. However, generally speaking, there is no guarantee that the result which satisfies equation (4) is indeed optimal since the equation may yield multiple solutions. Although situations of multiple solutions do arise, they are very rare in discrete event systems (DES), such as production systems, for most performance measures (e.g. system throughput). The sensitivity estimation of equation (4) is only a mathematical representation of an ideal balanced line situation. Within given manufacturing constraints (e.g., machine cycle time cannot be freely changed, buffer capacity and machine reliability, etc.), the balanced line situation should be an optimal solution since the system cannot be improved by changing any individual station's parameters.

In exemplary embodiments, in order to reach the balanced situation or optimal state, two steps are performed. First, performance deviation is tracked and sources are identified. For this purpose, in exemplary embodiments, an optimal trajectory is defined by searching maximum sensitivity values:

$$\max\left(\frac{\Delta TP_{sys}}{\Delta TP_1}, \frac{\Delta TP_{sys}}{\Delta TP_2}, \ldots, \frac{\Delta TP_{sys}}{\Delta TP_n}\right) \tag{5}$$

The station with the maximum value is the one whose throughput improvement will have the biggest impact to overall system throughput. This station is defined as the short-term production constraint, or bottleneck. Second, decisions need to be made to improve the production line performance. Therefore, the bottleneck station parameters are adjusted and the optimal trajectory is iteratively searched until the optimal condition, as defined by the sensitivity estimation equation is reached.

Process feedback control is central to this procedure. The feedback controller is framed into an optimization scheme. The objective function for the optimization problem is the expected system performance defined in the sensitivity estimation equation. In exemplary embodiments it is described as:

$$\frac{\Delta TP_{sys}}{\Delta TP_i} \leq \sigma \tag{6}$$

$$\forall i \in (1, \ldots, N)$$

where, $\sigma$ is numerical threshold, discussed in detail herein below.

In exemplary embodiments, the constraints to this optimization problem are defined as:

$$0 \leq \text{Buffer}_i(t) \leq \text{Buffer}_i(t)^{max}$$

$$MTTR_i(t)^{min} \leq MTTR_i(t) \leq MTTR_i(t)^{max}$$

$$MTBF_i(t)^{min} \leq MTBF_i(t) \leq MTBF_i(t)^{max}$$

$$\text{CycleTime}_i(t)^{min} \leq \text{CycleTime}_i(t) \leq \text{CycleTime}_i(t)^{max} \tag{7}$$

The optimization procedure iteratively searches bottlenecks through the optimal trajectory defined in equation (5) and adjusts parameters of the bottleneck stations until the production line reaches a nearly balanced situation.

Figure 4:
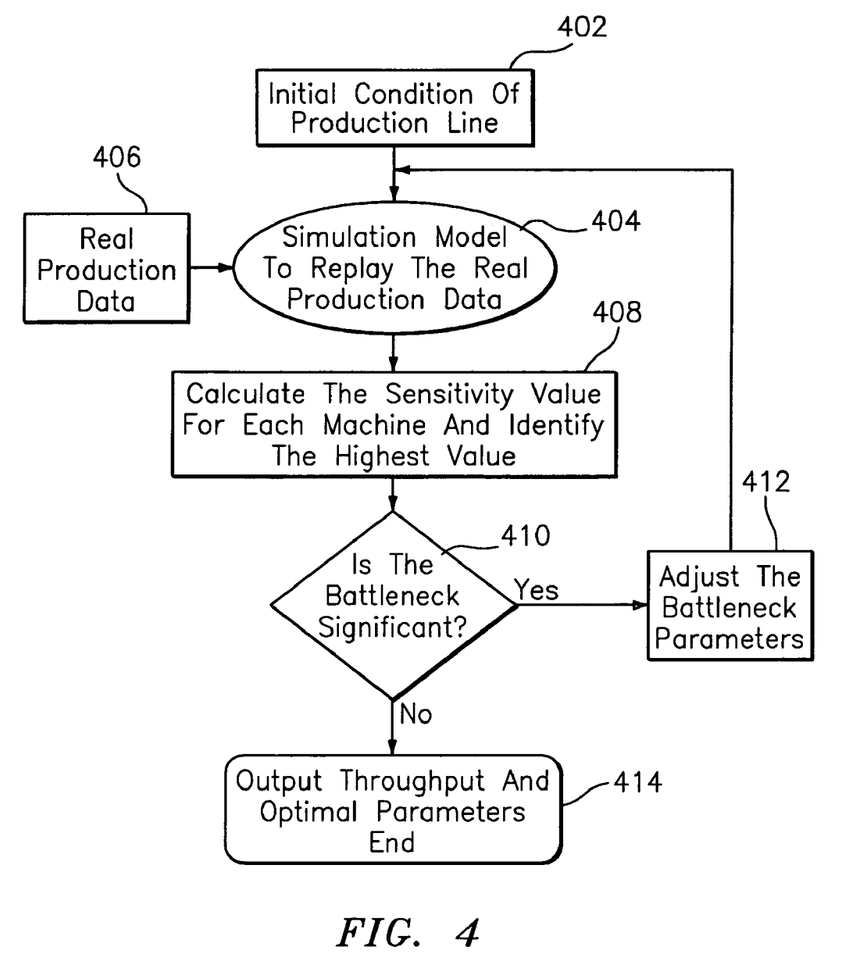
FIG. 4 is an exemplary process flow for performing an optimization algorithm.

An exemplary process flow for performing the optimization algorithm is depicted in FIG. 4. At block 402, the production line is at an initial condition. Customized simulators and/or commercially available production system simulators such as Simul8 from Simul8 Corporation and ProModel from ProModel Corporation may be utilized to execute the simulation. At block 404, a simulation model is utilized to replay the real production data 406. The real production data 406 is received in a real-time manner from the production line system and fed into the simulation model. At block 408, the sensitivity value for each machine 302 is calculated and the machine 302 with the highest value is identified (see description of short-term bottleneck identification described herein below). At block 410, it is determined if the bottleneck is significant. If the bottleneck with the highest value is not significant (i.e., the predicted actual performance is less than a second threshold value away from the planned level of performance), then processing continues at block 414, where the throughput and optimal control parameters are output (e.g., via an output device and transmitted to the production system). These parameters may then be input as control parameters into the production system 202 via the controllers 210. If the bottleneck is significant, as determined at block 410, then the bottleneck parameters are adjusted at block 412 and the simulation is repeated to determine if the adjusted parameters mitigate the bottleneck problem. Processing then continues at block 404. Exemplary embodiments for identifying the bottlenecks and adjusting the bottleneck station parameters are discussed herein below.

Short-Term Bottleneck Identification.

Figure 5:
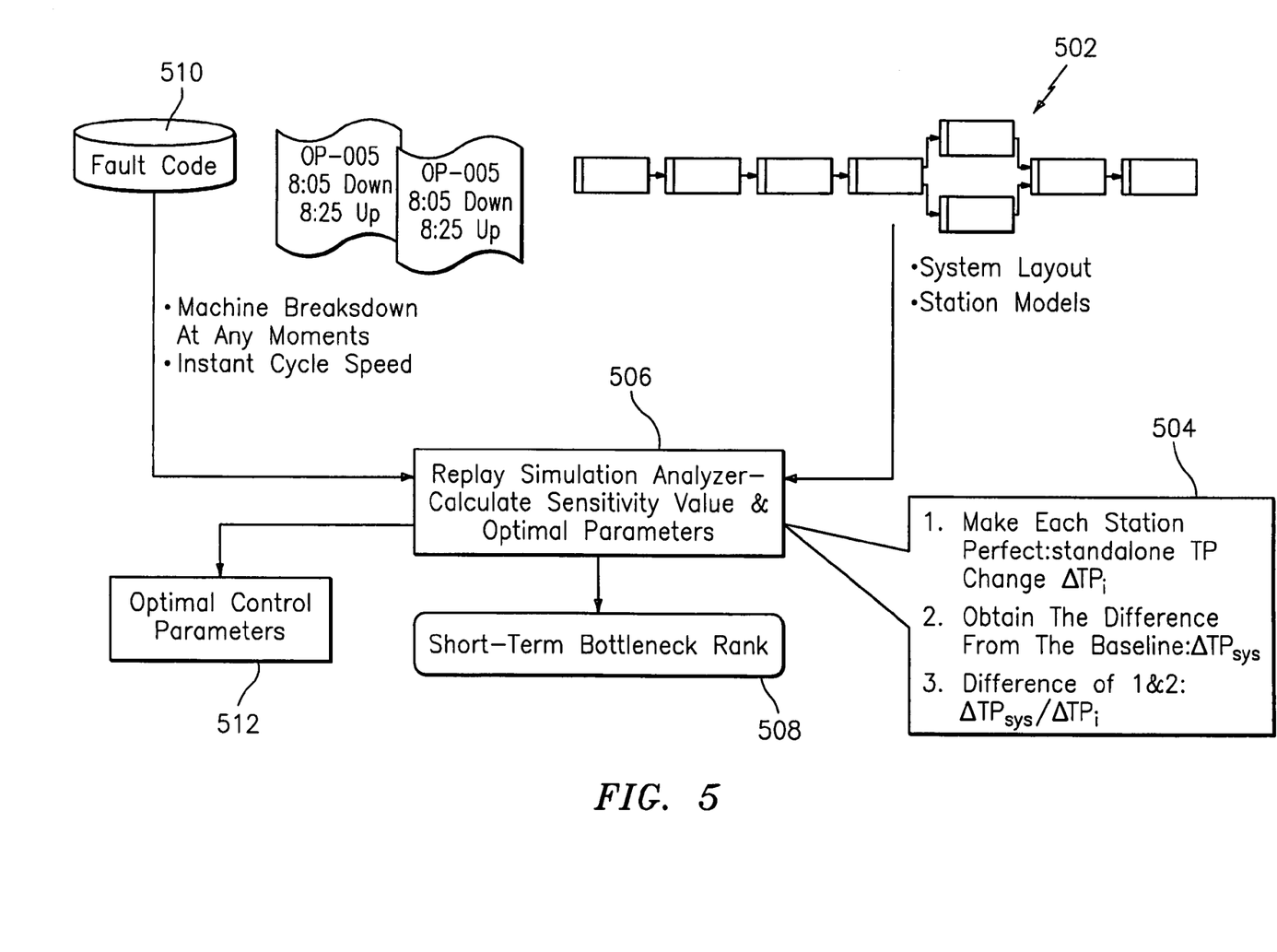
FIG. 5 is a block diagram of a system including a replay simulation analyzer that may be utilized by exemplary embodiments.

Since the functions of overall system throughput and individual station throughput are very complex non-linear functions, it is difficult to derive a closed form solution to $TP_{sys}$ for systems with more than two machines, let alone the calculation of sensitivity defined in equations (5) and (6). Exemplary embodiments utilize a replay simulation model to solve this problem. The input of the simulation is system layout, cycle time of each station, and failure history. The output of the simulation includes short-term bottleneck rankings and suggested control parameters for stations in the production system 202. Bottlenecks can be identified based on the system throughput and the sensitivity calculation. Instead of using MTTR, MTBF and randomly generating station failures based on assumed distribution, real historical fault data is used as depicted in FIG. 5. FIG. 5 depicts a replay simulation module to identify short-term production constraints including a replay simulation analyzer 506 for calculating a sensitivity value. As described previously, the replay simulation analyzer 506 may be implemented by a commercially available simulation application such as Simul8 or ProModel.

In exemplary embodiments, the sensitivity value is calculated by the steps shown in block 504 of FIG. 5; each station (or machine 302) is simulated to run in an optimal/planned manner and the standalone throughput (TP) change and a total system TP improvement are calculated and utilized to calculate the sensitivity value for each station. Input to the replay simulation analyzer 506 also includes fault code data 510. The fault code data 510 includes machine breakdowns at any moment and instant cycle speed. Output from the replay simulation analyzer 506 is the short-term bottleneck rank for the production system 202. Output also includes optimal control parameters 512 for the station associated with the bottleneck with the highest sensitivity, these control parameters 512 are input to one or more of the controllers 210 of the production system 202.

In exemplary embodiments, in order to reach a balanced situation, or optimal state, at least two steps are necessary. First, performance deviation is tracked and sources need to be identified. This step can be performed by the replay simulation module depicted in FIG. 5. The station with the maximum value as determined by the replay simulation module is the one whose throughput improvement will have the biggest impact to the overall system throughput. This station is defined as the system constraint, or bottleneck. The second step to reaching a balanced situation (or planned level of performance) is that decisions are made to adjust the production line performance. Therefore, corrective actions are applied by adjusting bottleneck station control parameters and a new search for the bottleneck starts. In exemplary embodiments, these two steps are repeated in an iterative manner until the optimal condition is reached. Also in exemplary embodiments, the simulation is performed in an off-line manner from the production system so that it can be performed while the production system is running.

The optimal condition can be defined according to individual system/production line performance and/or a predefined threshold or planned level of performance can be given as the ending condition. In general, for the bottleneck station, the control variables are initial buffer content levels, MTTR, MCBF and cycle time. The optimization procedure can be treated as a controller and the output is the control guide. One controllable parameter is repair time of the bottleneck station. Total repair time of a breakdown station includes waiting time for response, diagnosis and real fix time. Exemplary embodiments, allow the production system to be monitored in real-time and bottlenecks to be identified dynamically. Therefore, maintenance work can be prioritized dynamically according to the dynamic bottlenecks such that waiting time for response is reduced. Also, for the breakdowns that happen on bottleneck stations, maintenance resource can be dynamically reallocated (e.g., sending one more person to the bottleneck stations may shorten the real fix time). Overall, the controllers 210 will enable real-time decision making to dynamically prioritize maintenance work and dynamically allocate maintenance resources. In a best case, the final goal of achieving expected production performance is reached.

Another controllable parameter is buffer contents. Bottleneck problems can be mitigated by moving more buffer contents after the bottleneck. Usually, buffer contents will be filled after production shift (e.g., weekend shift) for night time work purposes. Since the bottleneck can be identified dynamically, buffer contents can be relocated to protect bottleneck stations.

In exemplary embodiments, sensitivity estimations are obtained by iteratively improving each station's parameter in isolation and observing the improvements of individual station's throughput improvements $\Delta TP_i$ and the improvements of total system throughput $\Delta TP_{sys}$. The sensitivity value of each station $\Delta TP_{sys}/\Delta TP_i$ is evaluated and the station with the highest sensitivity value is the bottleneck. In exemplary embodiments, it is assumed that the cycle time for each station cannot be freely changed. Therefore, each station's throughput will be improved by reducing its fault data so that the station has no failures and runs in a perfect condition.

The bottleneck calculation can be viewed as "case analyses." Case analysis can examine the system behavior for one or more discrete scenarios. In exemplary embodiments only one case is examined—the baseline case—since the "bottleneck analysis" automatically considers the impacts of station improvements relative to this state. In alternate exemplary embodiments, a series of cases could be set up, one per station, in which each station is improved in turn.

While standalone throughput of a station is a good indicator of a bottleneck, this measure does not reflect the throughput impact of station interactions. When buffers in an asynchronous production environment separate stations, the true bottleneck may have a higher standalone throughput than other stations.

Mitigating Short-Term Bottlenecks

In exemplary embodiments, the objective of short-term bottleneck analysis is to control the production line staying at a balanced status. Once a bottleneck has been identified, actions should be taken to improve/mitigate the bottleneck. Exemplary embodiments include initiatives to improve the bottleneck station, such as but not limited to: increasing MTBF, which means increasing station reliability; decreasing MTTR, which means increasing maintenance efficiency; increasing engineered job per hour (JPH); and increasing the number of buffers following the bottleneck station.

Exemplary embodiments include methods of buffer adjustment and decreasing MTTR, which are applicable in a typical factory. These modifications are simulated based on real-time data from the production system 202 to determine an optimal performance. The initial buffer level can be adjusted by placing the right initial buffer contents in a scheduled preventive maintenance shift, e.g., overtime shift or weekend shift. Decreasing MTTR or repair time can be achieved by setting higher priority to reactive maintenance events for the bottleneck stations.

Figure 6:
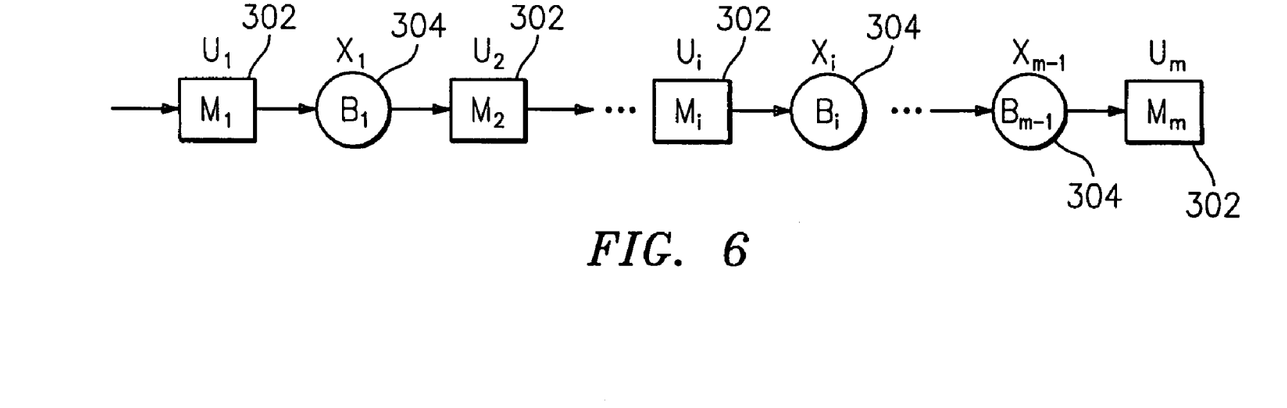
FIG. 6 depicts an exemplary serial production line.

First, a buffer optimization method to move buffer contents around the bottleneck is discussed. To illustrate the problem more clearly, the system dynamics are shown below. FIG. 6 depicts an exemplary serial line that produces only one part type. In this example, the level of buffer i is the continuous variable $X_i$, and $U_i$ is the process rate of station i. In exemplary embodiments, the dynamics of the system are:

$$\dot{X}_i = U_i - U_{i+1} \text{ where } (i=1 \ldots m-1); \quad (8)$$

and taking the integral of (8) from 0 to t results in:

$$X_i(t) = X_{i0} + \int_0^t (U_i - U_{i+1})dt; \quad (9)$$

where $X_{i0}$ is the initial level of buffer i. $X_i$ is bounded by 0 and buffer capacity $X_i^{max}$:

$$0 \leq X_i \leq X_i^{max}$$

$$(i=1 \ldots m-1); \quad (10)$$

In this example, the initial buffer level $X_{i0}$ can be adjusted such that $X_i$ is controlled in a certain level to ensure that no station in the line has significant impact to the overall production. Therefore, this on-line optimization method is utilized to optimize the initial buffer contents with the less effort.

Figure 7:
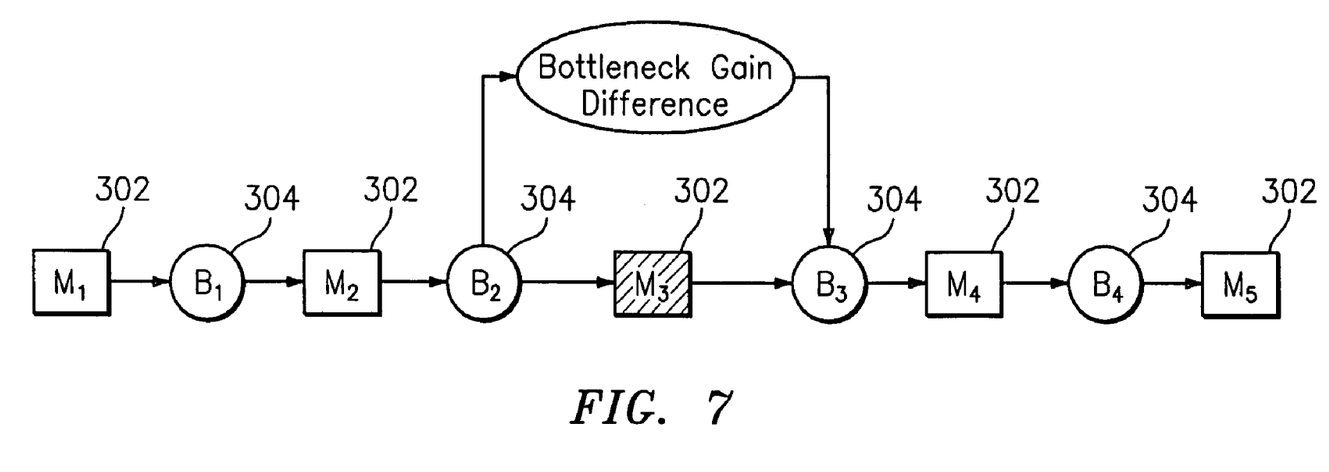
FIG. 7 depicts initial buffer contents being adjusted around a current bottleneck problem as implemented by exemplary embodiments.

In exemplary embodiments, to optimize the initial buffer contents it is assumed that the buffer capacity is big (e.g., >10) and that the initial buffer level is adjustable at the beginning and end of every production shift. The on-line optimization of initial buffer levels can be viewed as a reactive correction of the current bottleneck problem. The initial buffer contents are adjusted around the bottleneck station as demonstrated in FIG. 7, where the machine 302 labeled "M3" is the bottleneck. For every iteration step of the optimization, the sensitivity value for each station is calculated through the simulation. The bottleneck is identified through searching for maximum sensitivity values. In exemplary embodiments, "bottleneck gain" for each station is defined as $\Delta_i$ where:

$$\Delta_i = PR_{sys,i} - PR_{sys,baseline}; \quad (11)$$

where, $PR_{sys,i}$ represents the total system production when throughput of station i is improved and $PR_{sys,baseline}$ is the baseline system production.

The "bottleneck gain" difference of the most significant bottleneck and the second most significant bottleneck can be calculated and represented as:

$$\delta = \Delta_1 - \Delta_2; \quad (12)$$

where, $\Delta_1$ is the "bottleneck gain" of the most significant bottleneck and $\Delta_2$ is the "bottleneck gain" of the second most significant bottleneck.

The initial buffer level around the bottleneck station i is adjusted by the simulator by adding $\delta$ to downstream buffer $X_{i,0}$ and taking out the same amount of $\delta$ from upstream buffer $X_{i-1,0}$ as:

$$X_{i,0}' = X_{i,0} + \delta$$

$$X_{i-1,0}' = X_{i-1,0} - \delta \quad (13)$$

This adjustment is repeated for each iteration step until the nearly balanced line condition is reached. Note that the adjustment can be treated as a control or decision action and can be used as control guide for next time step (e.g., next day or next week). It should also be noted that in exemplary embodiments, the buffer adjustment has to be within the constraint: $0 \leq Buffer_i \leq Buffer_i^{max}$.

The rationale of the initial buffer adjustment comes from the meaning of "bottleneck gain." The "bottleneck gain" can be viewed as the amount of production loss caused by the bottleneck. Consequently, moving the "bottleneck gain" difference to downstream of the bottleneck station helps to decrease the severity of the most significant bottleneck and even the second most significant bottleneck. The same amount of buffer contents can be taken out from the upstream buffer since the bottleneck determines the throughput of a production system, and additional buffer contents in front of the bottleneck will not help to increase the system throughput. The adjustment helps avoiding downstream line starving and upstream blocking caused by the bottleneck station.

In general, the throughput of a production line increases with additional buffer contents. But, the introduction of buffers raises the level of WIP inventory, and, in turn, WIP may increase the operating cost. To gain maximum economical benefits, the buffer should be placed towards the bottleneck station. In addition, placing a buffer (with the optimal contents) after the bottleneck may yield lower holding cost while gaining good performance. Exemplary embodiments, provide a quantitative method for determining optimal buffer level to achieve a balanced production flow.

Another manner of improving a bottleneck is to decrease repair time or MTTR of the bottleneck station. In many cases, when maintenance personnel focus on a specific station and set it as the highest priority, it is common to achieve more than fifty percent of significant MTTR reduction. This is because a great portion of repair time is spent waiting (from maintenance call to maintenance personnel arriving) and on diagnosis. Exemplary embodiments include a quantitative method for aiding a decision maker in maintenance job priority setting by determining how much time should be reduced on repair time or MTTR to mitigate a bottleneck.

To determine the priority (i.e., the reduction of MTTR), the "bottleneck gain" is compared between the most significant bottleneck and the second most significant bottleneck. A ratio r is defined as:

$$r = \frac{\Delta_2}{\Delta_1} \quad (14)$$

where, $\Delta_1$ is the "bottleneck gain" of the most significant bottleneck and $\Delta_2$ is the "bottleneck gain" of the second most significant bottleneck, and where 0<r<1. This ratio is a weighted factor to apply to the current bottleneck's MTTR or repair time. The rationale of weighting the repair time by the weighted factor (defined in equation (14)) is to even the most significant bottleneck station to the second most significant bottleneck in each iteration step such that the production line is balanced. This can be expressed as:

Adjusted Bottleneck $MTTR = r*$Bottleneck $MTTR$ (15)

In exemplary embodiments, this ratio is applied for every iteration step in the simulator until the ending condition is reached. Note that the repair time has to be within the constraint: $MTTR_i^{min} \leq MTTR_i \leq MTTR_i^{max}$.

Numerical Threshold and Control Step.

The ending condition of the optimization procedure in the simulator is defined in equation (6) as:

$$\frac{\Delta TP_{sys}}{\Delta TP_i} \leq \sigma$$

where $\forall i \in (1, \ldots, N)$ and $\sigma$ is a numerical threshold. A method to determine the threshold is to check the improvement for each optimization step. When the bottleneck problem is significant, improving the worst bottleneck station standalone throughput will result in approximately the same overall system throughput improvements. Therefore, the sensitivity value is approximated to be 1. This value can be used as a starting point of any optimization iteration. For each optimization step, the ratio of the sensitivity value with respect to the starting point value of 1 is evaluated. It is defined that if the ratio is less than 5%, the iteration can be stopped and the system is considered nearly balanced.

An important concept in process control is the principle of feedback control of dynamic systems such as thermostat feedback control mechanism. However, in managing business process or manufacturing assembly process, continuous and automatic feedback control may not be economical (or even possible). The manager must make decision on how frequently to monitor process performance. Frequent observation improves both the chance of discovering any degradation in performance and the likelihood of speedy recovery. Unfortunately, frequent observation also increases the cost of monitoring. The time unit for "on-line" control in exemplary embodiments is therefore not necessarily minutes, or seconds. "On-line" could mean days depend on specific requirements of different production systems.

In practice, by shift, daily or weekly control is acceptable, since usually the initial buffer will not impact for more than 1 week (in some cases, for more than 1 day). Therefore, more than a one-week period is too long for an effective control. Also, when focusing repair team on bottleneck stations, it is neither feasible nor efficient to frequently change the focus. It is agreed in practice that changing the focus on a shift/daily basis is acceptable. Therefore, if a production line has a relatively big buffer capacity (e.g., more than 100), weekly control is acceptable. Otherwise, shift and daily controls are more appropriate.

A traditional definition of a bottleneck is the workstation having the highest long-term utilization. By long term it means that outages due to machine failures, operator breaks, quality problems, etc., are averaged out over the time horizon under consideration (a long-term). This implies that the proper treatment of outages will differ depending on the planning frequency. For example, for daily re-planning, outages typically experienced during a day should be included. Therefore, the term short-term production constraint refers to the workstation having the highest utilization during a projected (short-term) time horizon. A short-term may be defined to include any time period of interest such as a minute, an hour, a shift, a day, etc.. Exemplary embodiments consider and treat outages during the projected (short-term) time horizon.

Exemplary embodiments may be utilized to more accurately determine short-term production constraints based on performance objectives. For example, performance objectives may be associated with the throughput and with first time quality.

In exemplary embodiments, the feed-back control procedure will allow the production system to reach a more balanced situation (i.e., get closer to a planned level of performance), which may improve production efficiency (e.g., throughput).

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for controlling production systems, the method comprising:
    monitoring actual performance of a production system that includes a plurality of machines;
    comparing the actual performance of the production system to a planned level of performance of the production system, the comparing performed by a simulator;
    identifying one or more production constraints in the production system in response to the actual performance being more than a threshold value away from the planned level of performance, the identifying performed by the simulator;
    determining a corrective action for the production system to mitigate one or more of the production constraints, the determining performed by the simulator; and
    applying the corrective action to the production system, and
    wherein the comparing identifying and determining are performed by the simulator in an iterative manner until the corrective action results in the actual performance being less than a second threshold value away from the planned level of performance.

2. The method of claim 1 wherein the simulator is off-line from the production system.

3. The method of claim 1 wherein input to the monitoring includes real-time data from the production system.

4. The method of claim 1 wherein the corrective action includes performing maintenance work on one or more of the machines associated with one or more of the production constraints.

5. The method of claim 1 wherein the corrective action includes changing a production cycle speed associated with the production system.

6. The method of claim 1 wherein the corrective action is applied to the production constraint with the highest impact on throughput in the production system.

7. The method of claim 1 wherein the corrective action includes adjusting one or more control parameters on one or more of the machines in the production system.

8. The method of claim 1 wherein the production system further includes one or more buffers.

9. The method of claim 8 wherein the corrective action includes moving contents of one or more of the buffers.

10. The method of claim 1 wherein the planned level of performance includes a throughput measure.

11. A system for controlling production systems, the system comprising:
- an output device in communication with a production system that includes a plurality of machines; and
- a processor in communication with the output device and including computer instructions for facilitating:
- monitoring actual performance of the production system;
- comparing the actual performance of the production system to a planned level of performance of the production system;
- identifying one or more production constraints in the production system in response to the actual performance being more than a threshold value away from the planned level of performance;
- determining a corrective action for the production system to mitigate one or more of the production constraints, wherein the comparing, identifying and determining are performed by a simulator in an iterative manner until the corrective action results in the actual performance being less than a second threshold value away from the planned level of performance; and
- applying the corrective action to the production system via the output device.

12. The system of claim 11 wherein input to the monitoring includes real-time data from the production system.

13. A computer program product for controlling production systems, the computer program product comprising:
- a storage medium readable by a processing circuit and storing instructions for execution by the processing circuit for facilitating a method comprising:
- monitoring actual performance of a production system that includes a plurality of machines;
- comparing the actual performance of the production system to a planned level of performance of the production system, the comparing performed by a simulator that is off-line from the production system;
- identifying one or more production constraints in the production system in response to the actual performance being more than a threshold value away from the planned level of performance, the identifying performed by the simulator;
- determining a corrective action for the production system to mitigate one or more of the production constraints; and
- applying the corrective action to the production system, and
- wherein the comparing, identifying and determining are performed by the simulator in an iterative manner until the corrective action results in the actual performance being less than a second threshold value away from the planned level of performance.

14. The computer program product of claim 13 wherein input to the monitoring includes real-time data from the production system.

15. The computer program product of claim 13 wherein the corrective action is applied to the production constraint with the highest impact on throughput in the production system.

16. A method for controlling production systems, the method comprising:
- monitoring actual performance of a production system that includes a plurality of machines;
- comparing the actual performance of the production system to a planned level of performance of the production system;
- identifying one or more production constraints in the production system in response to the actual performance being more than a threshold value away from the planned level of performance;
- determining a corrective action for the production system to mitigate one or more of the production constraints, wherein the corrective action includes changing a production cycle speed associated with the production system; and
- applying the corrective action to the production system, and
- wherein the comparing, identifying in and determining are performed by a simulator in an iterative manner until the corrective action results in the actual performance being less than a second threshold value away from the planned level of performance.

17. A method for controlling production systems, the method comprising:
- monitoring actual performance of a production system that includes a plurality of machines;
- comparing the actual performance of the production system to a planned level of performance of the production system;
- identifying one or more production constraints in the production system in response to the actual performance being more than a threshold value away from the planned level of performance;
- determining a corrective action for the production system to mitigate one or more of the production constraints; and
- applying the corrective action to the production system, wherein the correction action is applied to the production constraint with the highest impact on throughput in the production system, and
- wherein the comparing, identifying and determining are performed by a simulator in an iterative manner until the corrective action results in the actual performance being less than a second threshold value away from the planned level of performance.

18. A method for controlling production systems, the method comprising:
- monitoring actual performance of a production system that includes a plurality of machines and one or more buffers;
- comparing the actual performance of the production system to a planned level of performance of the production system;
- identifying one or more production constraints in the production system in response to the actual performance being more than a threshold value away from the planned level of performance;
- determining a corrective action for the production system to mitigate one or more of the production constraints, wherein the corrective action includes moving contents of one or more of the buffers; and
- applying the corrective action to the production system, and
- wherein the comparing, identifying and determining are performed by a simulator in an iterative manner until the corrective action results in the actual performance being less than a second threshold value away from the planned level of performance.

19. A computer program product for controlling production systems, the computer program product comprising:
- a storage medium readable by a processing circuit and storing instructions for execution by the processing circuit for facilitating a method comprising:

monitoring actual performance of a production system that includes a plurality of machines;

comparing the actual performance of the production system to a planned level of performance of the production system;

identifying one or more production constraints in the production system in response to the actual performance being more than a threshold value away from the planned level of performance;

determining a corrective action for the production system to mitigate one or more of the production constraints; and applying the corrective action to the production system, wherein the corrective action is applied to the production constraint with the highest impact on throughput in the production system, and wherein the comparing, identifying and determining are performed by a simulator in an iterative manner until the corrective action results in the actual performance being less than a second threshold value away from the planned level of performance.

* * * * *